July 14, 1970    S. BOUSKY    3,520,586
ENTRANT BEAM OPTICAL SCANNER
Filed June 20, 1966    4 Sheets-Sheet 1
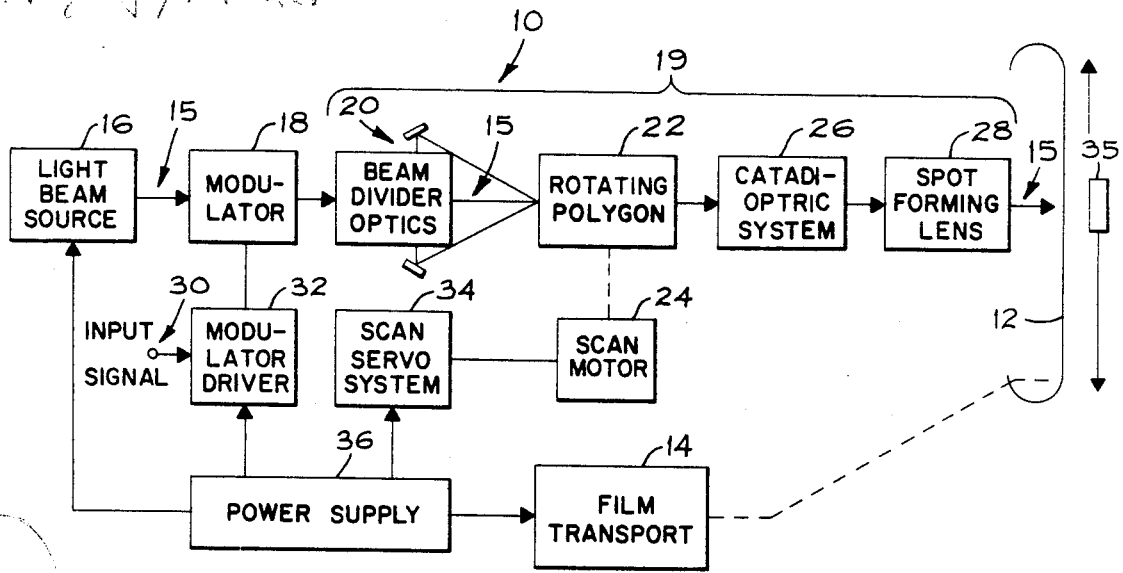
FIG_1
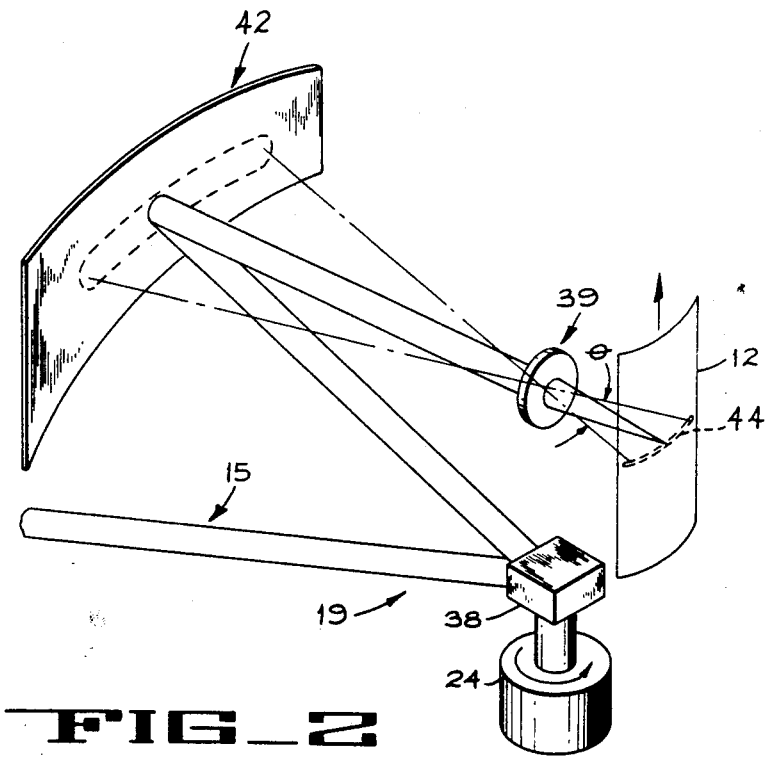
FIG_2
INVENTOR.
SAMUEL BOUSKY
BY Robert H. Clay
ATTORNEY

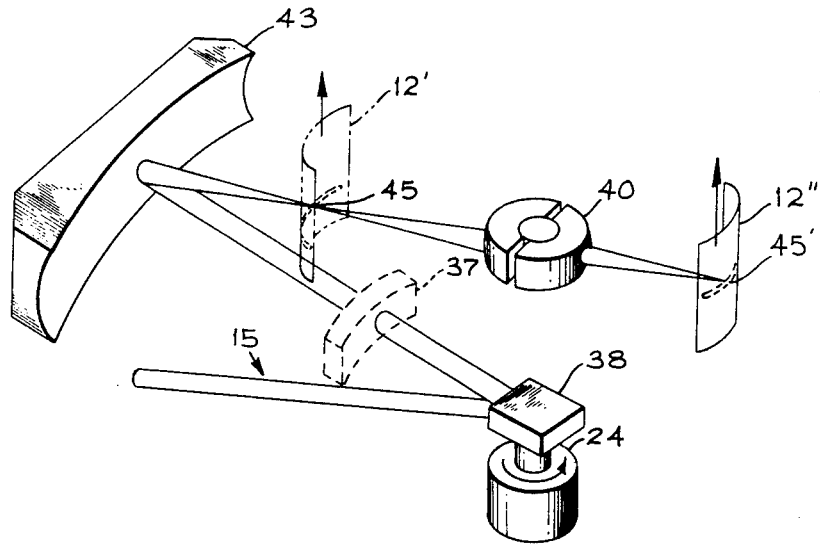
FIG_3
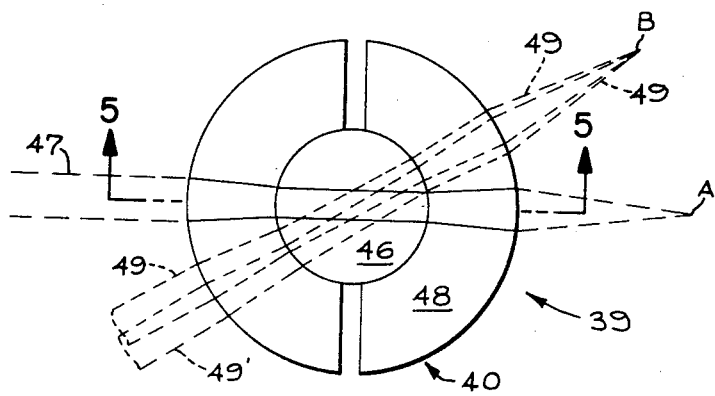
FIG_4
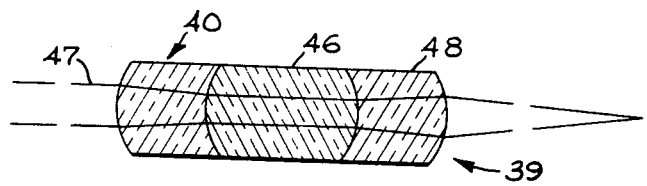
FIG_5
INVENTOR.
SAMUEL BOUSKY

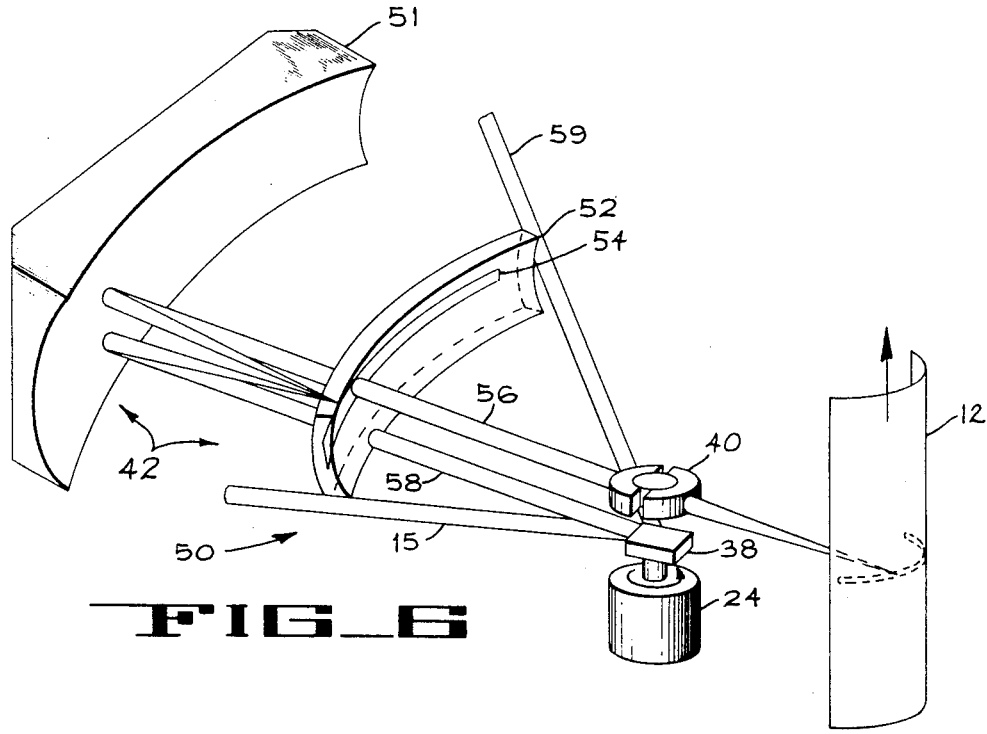
FIG_6
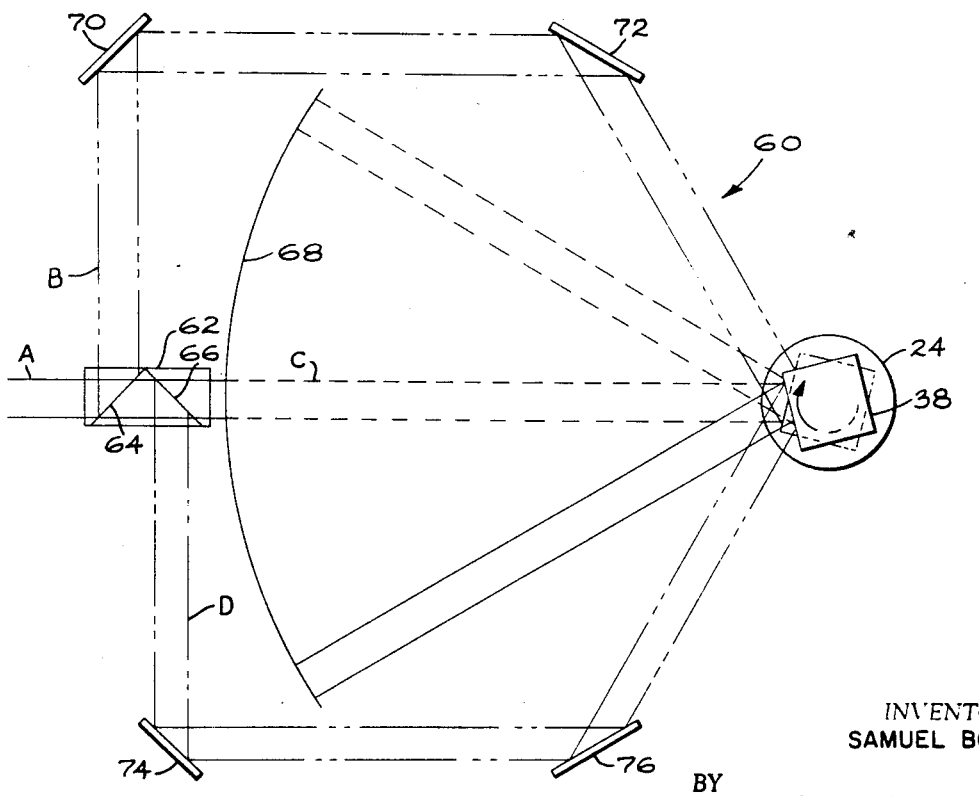
FIG_7

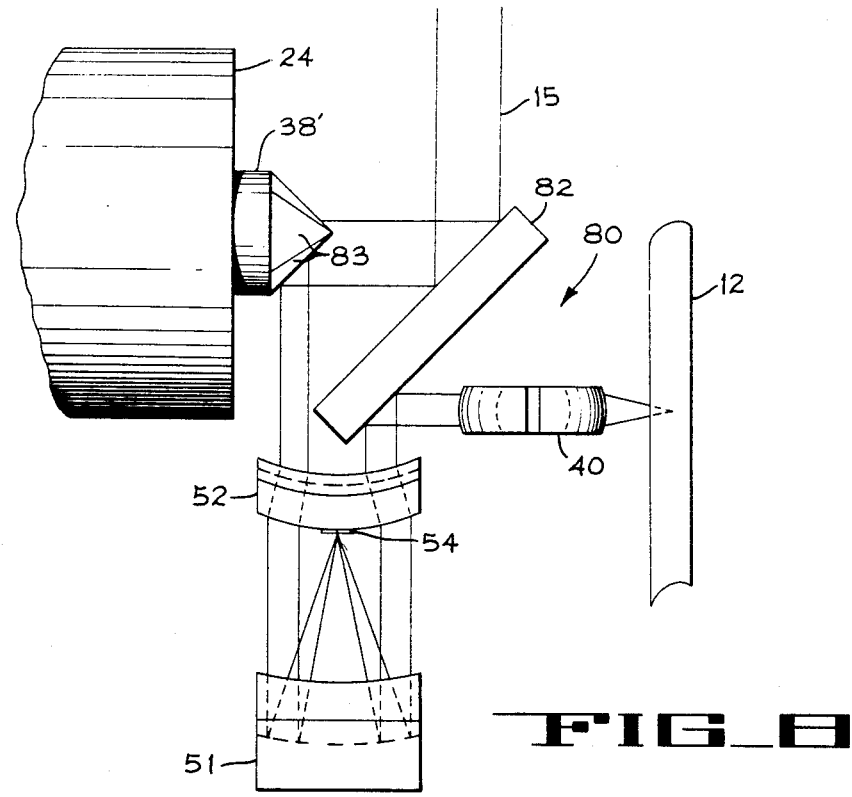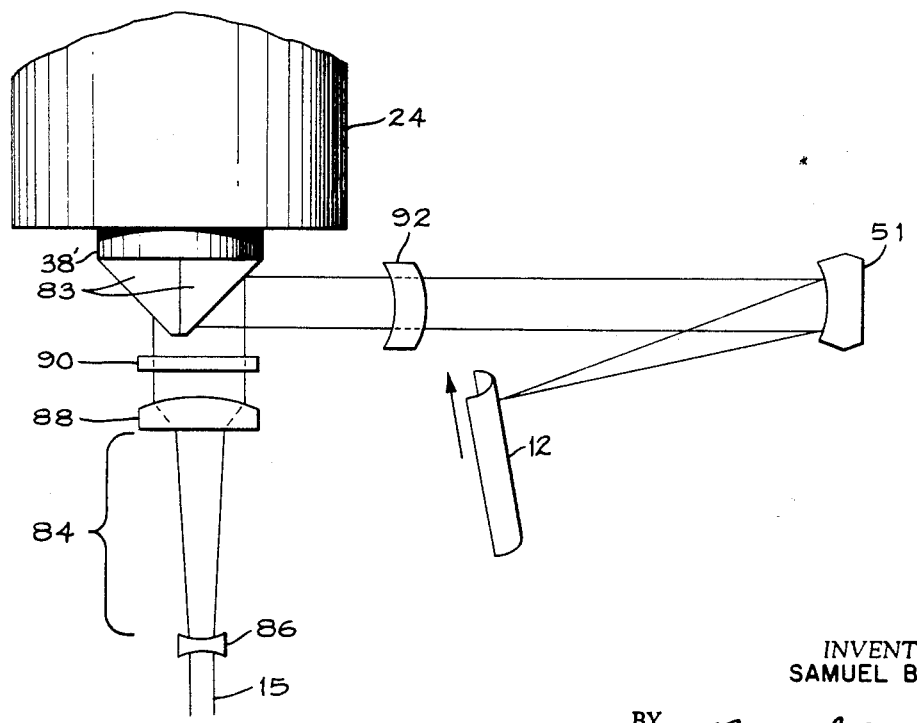

United States Patent Office 3,520,586
Patented July 14, 1970

3,520,586
ENTRANT BEAM OPTICAL SCANNER
Samuel Bousky, Woodside, Calif., assignor to Ampex Corporation, Redwood City, Calif., a corporation of California
Filed June 20, 1966, Ser. No. 558,902
Int. Cl. G02b 17/00
U.S. Cl. 350—6   6 Claims

ABSTRACT OF THE DISCLOSURE

Light beam scanning apparatus including an entrant beam scanning system having an optical deflecting axis wherein at least one entrant light beam is redirected as a scan beam which is deflected (pivoted) through a selected scan angle via a rotatable deflecting means. The scan beam is redirected by fixed optical reflective means of the entrant beam scanning system, whereupon the redirected beam is directed substantially back towards the optical deflecting axis of the rotatable deflecting means. The fixed optical reflective means provides apparatus which shapes and focuses the beam to define the scan beam having a scan spot which describes an arcuate line of length commensurate with the selected scan angle. In accordance with the invention, the scan beam pivots about a virtual center of beam rotation which is colinear with the optical deflecting axis.

---

The invention herein described was made in the course of a contract with the Department of Air Force.

The present invention relates to wideband optical data record and readout systems and more particularly to a high resolution, spot focusing optical scanning and recording system for recording and readout of information from mediums such as photographic transparencies and printed material, which system utilizes a diffraction-limited scan spot and a unique entrant beam scan system.

At present, there are various devices capable of high speed mechanical scanning for purposes of recording and playback of pictorial images or of instrumentation data. Typical among these are the cathode ray tube flying-spot scanner and the direct electron beam scanning systems. Such systems each have various inherent limitations and disadvantages such as for example, cumbersome and relatively inefficient optical schemes, decreased capabilities due to phosphor granularity resulting in lower signal-to-noise ratio and decreased dynamic range, the need to maintain the recording medium within a vacuum chamber and thus requiring continuous vacuum pumping, the lifetime limitation of the electron gun cathode, and the large size, weight and cumbersome design, as well as the high cost of the overall systems. In addition, typical mechanical scanning methods employed in some of the prior art systems generally utilize a multi-faced rotating mirror positioned between the spot forming lenses and the focused spot, thereby introducing limitations such as dead time, scan line distortion and short scan line capabilities.

Recently, the discovery and development of lasers as a source of coherent, high power, narrow beam, monochromatic light, has led to new methods of data recording and readout utilizing various laser scanning or beam deflection techniques. Notable among these techniques are, electrically induced changes of refractive index in electro-optical materials, sonically induced refractive index changes in gases or solids, switching between the ordinary and extraordinary ray in birefringent materials, and interaction of light with sonic waves or light waves. Such techniques are generally considered in terms of small angular deflections up to about 100 spot diameters and accordingly deflections of the order of 10,000 spot diameters do not appear to be practical at present. Moreover, such techniques are primarily applicable to deflection of light beams rather than deflection of focused light spots.

The present invention provides a diffraction-limited spot scanning system for linear scanning of long scan line lengths and high scan rates, with minimum deadtime between scans while working at the optical diffraction limit. In its preferred embodiment the invention utilizes a laser beam generator and provides for mechanical scanning of the beam on a recording or prerecorded medium composed of a light sensitive material such as silver halide, photo-plastic or photo-chromic materials, an example of which is described in U.S. Pat. 3,403,387, issued Sept. 24, 1968, and assigned to the assignee of this application. The invention utilizes in combination therewith a unique optical scan system having a minimum of moving parts and of rotating mass. More particularly, the mechanical scanning mechanism, hereinafter termed an entrant beam deflection system, utilizes a beam of light which is deflected by a rotational reflective means and then redirected by optical means, whereupon it may be directed substantially back to the rotational axis into the fixed pupil of a spot forming lens, such that scanning of the focused spot occurs at the focal surface of the lens.

Accordingly, it is an object of the invention to provide a wideband optical scanning system capable of record and readout at bandwidths from about 10 to over 100 megahertz (mHz.) utilizing a diffraction-limited scanning light spot.

It is another object of the invention to provide linear scanning of long line lengths and high scan rates, with a minimum of dead time between scans while working at the optical diffraction limit.

It is a further object of the invention to provide an entrant beam scan system wherein recording and readout is accomplished under atmospheric conditions without the need for a vacuum chamber and associated vacuum apparatus.

It is still another object of the invention to provide a laser beam record and readout system capable of deflecting a light spot, of for example, from 2–10 microns size, over line lengths of 5000 to 20,000 spot diameters at line rates of 1000 to 10,000 lines per second, and at bandwidths of from 10 to 100 megahertz.

It is still a further object of the inventioon to provide a unique mechanical scanning system herein termed an entrant beam deflection system utilizing a rotational deflecting means to deflect an entrant light beam into an optical fixed reflective means which directs the beam back towards the deflecting axis to define a focused light beam.

It is another object of the invention to provide an entrant beam scan system, wherein scanning of a spot is provided through a selected scan angle wherein pivoting of the beam occurs about the nodal center of a fixed spot forming lens.

It is still another object of the invention to provide an entrant beam scan system utilizing a plurality of entrant beams.

Other objects and advantages will be apparent from the specification taken in conjunction with the drawings wherein:

FIG. 1 is a block diagram of a diffraction-limited entrant beam optical record reproduce system of the present invention.

FIG. 2 is a perspective view of a schematic representation of an entrant beam deflection system intentionally oversimplified for explanatory purposes.

FIG. 3 is a perspective view of an entrant beam deflection system in accordance with the invention.

FIG. 4 is a top view of a concentric lens utilized in the entrant beam deflection system of the present invention.

FIG. 5 is a cross section view of the concentric lens taken along line 5—5 of FIG. 4.

FIG. 6 is a perspective view depicting a practical embodiment of the beam deflection system in greater detail.

FIGS. 7, 8 and 9 are schematic representations of alternative embodiments of the present invention.

Mechanical rotational scanning methods or systems may be grouped into three basic classes or groups in terms of the region in the optical spot forming system where beam deflection through a select angle is introduced. These are herein termed; the pupil method, the exit bundle method and the entrant bundle method.

The pupil method produces scanning by rotation of the lens pupil itself, wherein the focused spot sweeps along a circular arc. The method is limited to relatively low rotational rates in order to maintain lens location and focal position alignments during rotation.

The exit bundle method is effected by introducing a reflecting surface in the exit ray bundle between the lens and the focused spot. This method is limited due to the introduction of appreciable scan nonlinearity and shift of focal position because of translation errors. In addition, unless dual beams are employed, excessive deadtime occurs as the corners between successive mirror faces traverse through the exit bundle.

In the entrant beam method the ray bundle entering the spot forming lens is rotated about an axis through the lens such that the beam always enters the pupil. The method utilizes an off-axis spherical mirror and associated optical members to reflect the beam back towards the lengs along a preselected path while sweeping the beam through a selected angle. The present invention utilizes the entrant beam method concepts.

The invention may be utilized in the form of several embodiments and modifications thereof as hereinafter more particularly described. In all embodiments however, the invention utilizes the basic combination of a light source, an optical system which includes an entrant beam scanning system, a film transport, and a modulator and associated circuitry for varying the scanning beam in proportion to the input information. The optical system is disposed to receive the beam of light, preferably an intense collimated beam as provided by a laser generator and is adapted to deflect the beam through a preselected scan angle by means of a rotating mirror member. Thus, the beam is received by the optical system and is redirected therefrom via the entrant beam scanning system in the form of a focused spot. The spot is swept through the preselected scan angle and along a curved path which lies coincident with the surface of the film within which the information is to be recorded, or from which readout is performed. The entrant beam scanning system preferably, but not necessarily, employs a fixed, spherical, concentric spot forming or relaying lens.

Accordingly, in one embodiment the scanning beam is shaped and focused by fixed, curved reflective means of the entrant beam scanning system, wherein the scanning beam pivots about an optical deflecting axis common to the system. In a further embodiment the scanning beam is shaped and focused by the fixed, spherical, concentric spot forming lens, which has its nodal center coincident with the optical deflecting axis, wherein beam pivoting occurs about the nodal center thereof and thus about the optical deflecting axis of the entrant beam scanning system.

FIG. 1 shows a simplified block diagram of a scanning and recording system of the invention utilizing a recording medium of the type previously mentioned, preferably in the form of a film or tape 12. In order to effect area scan of the photographic film or tape 12, a generally conventional tape transport system 14 is utilized to drive the tape 12 while a tape guide device thereof is modified to shape the tape into the above-mentioned curved surface at the scan line. Thus, scanning is accomplished substantially at a right angle to the movement of the tape 12. As noted, since the recording spot moves in a circular arc the film 12 is accurately curved into a similar cricular arc at the scan surface, such as further described hereinafter. A light beam 15, designated generally by the heavy arrows, is generated within a light beam source 16 comprising preferably a laser beam generator. A light beam modulator 18 is disposed to intercept the beam 15 prior to its introduction into an optical deflection system generally designated by the numeral 19 and particularly, in a multiple beam embodiment, into beam divider optics means 20 thereof. Within the optical deflection system 19 the light beam is directed to a rotating polygon 22 which is driven by a scan motor 24. The beam is swept through a preselected scan angle by the rotating polygon 22 and into a catadioptric scan system 26, whereupon it is directed through a spot-forming lens 28 and is focused thereby on the curved plane of film 12. An input signal representative of the information to be recorded is introduced to an input terminal 30 and from thence to a modulator driver 32. The signal is modified by the modulator driver 32 and is fed to the modulator 18 to energize same in accordance with the input information, whereby the beam 15 is modulated in accordance with the input information. A servo system 34 is utilized to control the rotational rate of the scan motor 24. The scan motor 24 is in turn electrically coupled to a film speed control servo (not shown) whereby the rotational rate of the scan motor 24 is determined and maintained constant relative to the speed of the tape 12. A power supply 36 is connected to the light beam system 16, the modulator driver 32, the film transport 14 and the servo system 34, to provide suitable power inputs to the respective components. The driver 32, servo 34, transport 14, light source 16, and motor 24 are generally known in the art and accordingly are not further described herein.

It is to be understood that the scanning and recording system herein shown in FIG. 1 and as described so far, is the recording portion of the system. The scanning or readout portion of the system utilizes basically the same components as heretofore described with the exception of the light beam modulator 18 which is obviously not used during the reproducing process. Thus the modulator 18 is held in a wide open condition or to allow the light beam 15 to pass therethrough unattenuated, during the reproduce process. In addition, a light sensing means such as for example, a photomultiplier 35, is employed behind the tape 12 to receive and sense the light which passes through the tape 12. The amount of light sensed by the photomultiplier 35 is proportional to the information stored in the tape 12, and the output signal from the photomultiplier is in turn proportional to the amount of light. The output signal is introduced to suitable processing circuits (not shown) which are well known in the art and not further described herein.

Referring now to FIG. 2 the optical deflection system 19 is depicted, by way of explanatory example only, as a simplification of an entrant beam deflection system. The incoming collimated beam 15 is directed against a surface of a multi-faced polygon 38 which is driven by the scan motor 24. A lens system 39 is disposed generally along the axis of the motor, and a cylindrical mirror system 42 is disposed in fixed, spaced relation from the lens system 39 and the rotating polygon 38, whereby the nodal center of the lens system 39 is disposed on the optical deflecting axis of the rotating polygon 38, and the center of curvature of the cylindrical mirror system 42 is coincident with the optical deflecting axis through the polygon and lens system. Light reflected from the rotating polygon 38 is directed into the cylindrical mirror system 42 and is reflected back to the lens pupil of the lens system 39, for any angular deflection of the input beam 15 provided by the rotating polygon 38. Thus, as shown, a scanning line designated by numeral 44 is obtained along the curved surface of the film 12, transverse to the direction of motion thereof. It may be seen that such an entrant beam deflection system employs the lens system 39 whereby the entering beam 15 is caused to sweep through a selected angle θ while entering at the center of the lens of the lens system 39.

The system of FIG. 2 is a somewhat idealized form of the invention, as lenses are normally not too effective in maintaining diffraction-limited performance very far off axis. In working with laser energy and a curved focal plane such as presented by film 12, corrections for color and field do not have to be made in the lens design. Only spherical aberration and coma need be considered. Thus, the lens system 39 preferably comprises a spherical, concentric lens design; that is, one having complete spherical symmetry as further described infra, which provides diffraction limited off-axis performance through angles as large as 60° or over a 120° scan angle.

In addition, reflection of the beam 15 from a cylindrical surface such as presented by cylindrical mirror system 42, does affect the collimation thereof along one axis and interferes with spot formation by the lens system 39. Accordingly therefore, a spherical reflector configuration further described infra, is preferred as an embodiment of the invention combination to provide diffraction-limited performance.

To this end, FIG. 3 depicts preferred extensions to the system of FIG. 2, further illustrating the invention. In FIG. 3 the cylindrical mirror system 42 is replaced by a spherical reflector 43 of previous mention, which not only reflects the incoming swept beam but also provides the function of a lens such as that of the lens system 39, thereby providing for entrant beam focusing of the beam along a path 45 disposed one-half the reflector radius of curvature therefrom. Accordingly, a spot is formed along path 45, which spot is swept along a selected arc over an angle commensurate with the sweep of the beam reflected by the rotating polygon 38, and a tape 12' corresponding to the tape 12 of FIGS. 1 and 2 may be disposed with the width thereof lying along the arcuate path 45. Note however, that the film 12' is formed with the convex surface thereof facing the scanning beam. Accordingly, to provide not only a focused beam but also a preferred system wherein the scanning beam sweeps along a concave surface of a tape 12", a spherical concentric lens 40 replacing the lens system 39, is disposed with its nodal center on or substantially adjacent to the optical reflecting axis of the rotating polygon 38 as practical. The lens 40 accepts the diverging beam and refocuses it to a spot which sweeps along a 45' lying at a distance of twice the focal length thereof. Thus, in essence the concentric lens 40 is acting as a relay lens in this particular embodiment, to aid in not only re-forming a spot but also to properly position the optics and beam to make possible a practical record/reproduce system.

In practice, when working with spots which are determined by the diffraction limit of light, the spherical aberration contributed by the spherical reflector 43 should preferably be corrected. Thus a correcting lens 37 such as a concentric meniscus element is disposed as shown in phantom line to intercept the beam as it leaves the polygon 38 and thus shift the beam slightly to correct for the spherical aberration of the reflector 43.

Referring now to the FIGS. 4 and 5 there is shown the concentric lens 40 of FIG. 3 in greater detail. The concentric lens 40 comprises a fixed lens having concentric spherical symmetry to provide defraction-limited performance up to for example, a 120° scan angle. The concentric lens 40 consists of an inner sphere 46 of optical glass to which are cemented two annular hemispheres 48 of other suitable higher refractive index optical glass. All optical surfaces of the spheres and hemispheres are concentric as well as spherical. A narrow central zone of this composite sphere construction constitutes the actual lens. Because of the spherical symmetry of the concentric lens 40 the pupil distortion caused by the deviation or translation of an entrant ray bundle 47 from the optical axis of the lens is avoided. For example, the ray bundle 47 entering the lens 40 along the pupil thereof will come to a focus at point A. A deflected ray bundle 49 shown in phantom line, entering through the lens pupil will come to a focus at point B. If, in addition to the angular deflection the beam 49 experiences translation at the lens pupil, due to the translation of the mirror surface of the polygon 38, as indicated by bundle 49', the beam will still come to a focus at point B, thus introducing no error due to the translation of the bundle 49'. The only limitation on scan angle imposed by the lens 40 is at the point where the outer diameter of the internal ray bundle 47 approaches the edges of the hemisphere 48 as shown by ray bundles 49, 49'.

In the system of FIG. 3, which utilizes the concentric lens 40, correction has been made for the spherical aberration produced by the spherical lens reflector 43. To this end, as previously described, a correcting surface (correcting lens 37) is preferably disposed to intercept the beam at a selected distance from the spherical lens reflector 43. Accordingly, referring now to FIG. 6 there is shown in greater detail one embodiment of the invention, wherein the optical deflection system 19 is modified to include the various optical elements hereinabove discussed. More particularly, the optical deflection system 19 of FIG. 1 is herein depicted as an entrant beam, reflex catadioptric system 50 comprising the combination of the scan motor 24, the rotating polygon 38, the mirror system 42 and the concentric lens 40 of previous mention. The system is termed reflex catadioptric because of the reflected return of the beam through the system as further described infra. In the system 50 of FIG. 6 the cylindrical system 42 is modified to include a spherical and concentric reflector 51 and refractor 52, with the refractor 52 disposed between the reflector 51 and the concentric lens 40. A reflecting strip surface 54 of selected length, and formed for example of a thin layer of reflective material is deposited or otherwise disposed by way of example only upon the refractor 52 on the surface thereof nearest the reflector 51. Since the active surface of the reflector 51 and both surfaces of the refractor 52 are spherican and concentric, the surface of the refractor 52 upon which the reflecting strip surface 54 is disposed is at the focus of the reflector 51 or, more particularly, optically half way between the center of curvature of the reflector 51. Accordingly, the collimated beam 15 entering the system 50, is reflected from the rotating polygon 38 passed through the lateral edge of the refractor 52, and brought to focus on the reflecting surface 54 after incidence with the reflector 51. The beam is reflected from the reflecting surface 54 back to the reflector 51, and is then directed back through the refractor 52 and into the concentric lens 40 where it is focused upon the surface of the film 12. Thus, the reflex catadioptric system 50 provides a collimated beam, indicated by numeral 56, which is parallel to the incoming collimated beam indicated by numeral 58. It is to be understood that the reflecting strip or surface 54 does not have to be formed on the refractor 52 on the surface shown in FIG. 6, but can be formed on the furthest surface or supported by other suitable means. Also, the surface 54 may or may not be of spherical configuration.

Although the reflex catadioptric system 50 is herein shown with a single entering beam 15, the design thereof lends itself to a very compact precision structure that may be employed with a multiplicity of entrant beams, preferably either two or three. A second incoming beam is indicated by numeral 59 and is shown herein by way of an example of such a dual entrant beam configuration.

Referring to FIG. 7 there is shown the further modification of a multiple entrant beam, catadioptirc system 60 which is capable of utilizing several entrant beams in sequence in order to further reduce the rotational rate of the scan motor 24. For simplicity of presentation the entire catadioptric system itself is not shown in the FIG. 7; instead a general reflector surface 68 is shown by way of example only. More particularly, the entering collimated light beam A, corresponding to the beam 15 of the previous figures is directed from the modulator (FIG. 1) into a compound beam splitter 62 corresponding to a portion of the beam divider optics 20. Considering for example that each splitting surface loses 10% of the beam, a first surface 64 is adjusted so that 28% of the beam A is reflected to form beam B and 62% (100%-10%-28%) of the beam A is transmitted to a second surface 66. The second surface 66 is adjusted for equal transmission and reflection of the incoming beam and accordingly, beams C and D would be adjusted for (90%×62%)/2 or 28%. Thus the beams B, C and D may have equal intensities such as 28% of the entrant beam A. Beam C continues directly into incidence with the rotating polygon 38 and is reflected therefrom into the catadioptric system 26 depicted herein simply as the curved reflector surface 68. Beams B and C are directed through mirrors 70, 72 and 74, 76 respectively, and from thence to the rotating polygon 38. Thus, as the polygon 38 rotates the beams B, C, D, are sequentially reflected in that order into the reflector surface 68, and are swept through the preselected scan angle one after the other. It may be seen that the multiple entrant beam catadioptric system 60 provides thus 3 beam sweeps during the rotation of a single face of the rotating polygon 38 rather than a single sweep as in the preceding embodiments of the invention utilizing a single entrant beam. It is to be noted that when utilizing two beams the beams may enter the system along a plane passing perpendicularly through the reflector surface 68. However when using three or more entrant beams, the beams B, C, D, enter the system along a plane lying at a slight angle above or below the reflector surface 68, i.e., the reflector 43.

Referring now to FIG. 8 there is shown an alternative configuration 80 of the embodiment of FIG. 6 comprising the scan motor 24, the refractor 52 with reflecting surface 54 formed thereon, the reflector 51 and the concentric lens 40. The system is modified to include a double folding mirror 82 which is utilized at an angle of 45° to the beam 15 as a convenient means for moving the concentric lens 40 from its position along the catadioptric axis, in such a way as to preclude its interference with the rotational axis of the scan motor 24. In this system the rotating polygon 38 is replaced by a rotating pyramid 38'.

Although the rotating pyramid 38' may have any convenient number of faces it is herein exemplified as a hexagonal pyramid with a plurality of triangular faces 83 inclined at 45° with respect to the rotational axis. The pyramid 38' is illuminated by the incident beam 15 so that each scanning face surface 83 will be sequentially fully within the entrant beam, for example through each 60° line scan. As the pyramid 38' is rotated the beam reflected from the successive faces 83 will scan in a plane perpendicular to the axis and at an angular rate equal to the angular rate of the rotating pyramid 38'. The point at which the axis of the scanning beam crosses the axis of rotation is the entrance pupil of the optical system. The pyramid 38' is preferably ground to a cylindrical form next to the base thereof to reduce windage while rotating. Slight distortion of the faces 83 may occur near the base thereof due to the rotational acceleration. Thus, fused quartz steel or preferably beryllium may be used to form the pyramid 38' to minimize such distortion. Compensation for the distortion may be made by optical correction, particularly in the pyramid configuration since the reflected beam distortion remains fixed during rotation of the pyramid. The triangular faces 83 of the pyramid 38' may be designed to determine the pupil size and shape providing they are appropriately aluminized in the shape of an ellipse. While the rotating polygon 38 of FIGS. 6 and 7 provides a deflected beam having an angular rate of twice the speed of the polygon, note that in the rotating pyramid 38' embodiment, the beam has an angular rate equal to that of the pyramid 38'. Thus to achieve similar scan rates it is necessary to substantially double the speed of the rotating pyramid 38'.

FIG. 9 shows a further embodiment of the invention utilizing the scan motor 24, the rotating pyramid 38, the spherical reflector 51 and the recording film or tape 12. The incoming beam 15 is accepted by a pupil magnifier or reversed telescope 84, such as for example, an inverted Galilean telescope, which in this particular embodiment has a magnifying power of 1:3. The reversed telescope 84 may comprise a two-element system consisting of a singlet negative lens 86 and a singlet positive lens 88 separated a distance equal to the algebraic difference of their focal lengths. The positive lens 88 may be a plano-convex lens and the negative lens 86 may be a double concave lens. The diameter of the incoming beam 15 is expanded by the reversed telescope 84 as shown in the FIG. 9, and the expanded beam is introduced to a pupil filter element 90. Since constant spot size during rotation requires constant illumination across the pupil of the optical system, the pupil filter 90 provides for any intensity correction across the expanded beam which may be necessary to effect the required uniform light intensity.

The catadioptric system, herein shown by way of example, comprises essentially the reflector 51 and a meniscus corrector 92 of the type well known in the art. The system is shown with the film or tape 12 disposed to receive the focused beam from the reflector 51, such as previously mentioned in relation to FIG. 3. However, a folding mirror (not shown) could be disposed near the location of the tape 12 to displace the aperture laterally from the center of symmetry of the catadioptric system to provide a more readily accessible image. The beam could also be reflected from the folding mirror, in the manner shown in FIG. 8, into a concentric lens (not shown) such as lens 40, which would refocus the beam to a spot lying on a concave curved tape surface.

The entrant-beam system has the advantage of providing precise linear scan-velocity because translational deflections of the beam at the rotating polygon 38 are automatically utilized without angular or velocity error at the spot forming lens system 39.

As an example of various parameters and their determination for a system such as shown in FIGS. 1 and 8, the focal length of the spot forming lens (receiving essentially collimated light) is determined by the scan-line length and the total scan angle employed. The line length is substantially determined by the film width of the recording medium which usually falls into a selection of a few standardized values such as 16 mm., 35 mm., 70 mm., 5-inch or 9-inch width. The scan angle is determined by the scanning mirror which must have an integral number of facets and thus the scan angle can only be 360 degrees divided by an integer.

For a given laser wavelength, the optical aperture or beam diameter within the optical system is similarly determined by the desired spot size and the selected focal length. The quality of the optical system and precision of mechanical operation requires an offsetting compensation (increase) in beam diameter in order to attain the desired spot size in actual practice. The modified optical aperture may be represented within a design f/number for the optical system.

More particularly, by way of example only, in considering the design of a system such as that shown in FIG. 6, it may be preferable to start with specific requirements such as for example, scanning spot size, scan line length, and number of scan lines per second (line rate).

If the entering beam is collimated, monochromatic, and of uniform intensity distribution, then the diffraction limited spot size is given by:

$$d = k\lambda f$$

where:

λ=wavelength of light in microns
$f$=relative aperture, $f$/number
$d$=spot diameter
$k$=a constant which depends on how the spot size is defined. $k=1.33$ for the integration of a moving spot measured at the 10% to 90% intensity points.

Since there may be abberations and/or focal positional errors to allow for, the system design may utilize a smaller $f$/number than give above. The design $f$/number, $f'$, will be:

$$f' = F/B$$

where:

$f = k'f'$
$F$=focal length of concentric lens
$B$=beam diameter
$k'$=quality factor (1.05 to 1.30)

Thus if an initial requirement were for a 5 micron spot in a system utilizing 6328 A light and requiring a quality factor allowance at 10% then the focal length to beam diameter ratio is calculated to be approximately 6½. The focal length is related to line length by the equation:

$$F = \frac{L}{2\left(\frac{\pi}{N} - \frac{B}{R}\right)}$$

where:

L=line length
N=number of mirror faces
R=limiting catadioptric radius

The limiting catadioptric radius in the case of FIG. 6 is the concave radius of the refractor at the plane of the entering beams. One possible solution of the above is the following approximate values:

F=29 mm.
B=4.5 mm.
R=57 mm.
N=4 for a line length of 2.0 inches (50 mm.).

The thickness of the refractor and the spherical radius of the reflector are determined by optical design requirements for correction of spherical aberration and positioning of the convex surface of the refractor at the focal surface of the reflector. This procedure is well known in the optical design art and is accordingly not further described herein.

The rotation speed at the scan motor is given by:

$$\rho = 2NV_m$$

where:

$V_m$=motor speed in r.p.s.
$\rho$=line rate (scan lines per second)

The equivalent electrical bandwidth in such a system at the 71% response point is given by:

$$\frac{470\rho L}{d}$$

where L is in mm., $d$ is in microns, $\rho$ in lines per second and bandwidth in megahertz.

The equivalent design calculations for a similar system employing a pyramidal mirror, are somewhat simpler, since the relationships for focal length and line rate become:

$$F = \frac{LN}{2\pi}$$

$$\rho = NV_m$$

As previously mentioned scanning of the focused spot is accomplished at right angles with the optical scan direction, by continuously traversing the film 12 past the scan path during the scanning operation. The relationship between the illuminating spot of light and the film must be such that the exposed film is held at the focal point of the spot at all points along the spot scan path. Accordingly, since the recording or scanning spot moves along a circular arc path, the film 12 must be accurately curved into an arc coincident with the path. Such a film geometry is made possible by utilizing a film guide having such a geometry and herein termed a "canoe" or "canoe geometry." Such a guide is exemplified in U.S. Pat. No. 2,956,114, issued Oct. 11, 1960 to Ginsburg et al., and assigned to the assignee of this application, and provides for shaping a transition in the tape 12 which changes from a straight section to a circular section and back to a straight section.

The film transport utilized in driving the tape 12 through the canoe geometry and past the scan spot must meet various requirements and tolerances with respect to speed, tape tension, transverse stability, etc. Such a film transport system may be for example of the type described in the above noted U.S. Pat. No. 2,956,114.

The modulator 18 of FIG. 1 may be any of the several known electro-optical light modulators, such as for example, a Pockels Cell modulator such as the Model 320 manufactured by Spectra-Physics in Mountain View, Calif., having a bandwidth capability of 10 to 20 mHz.

What is claimed is:

1. An entrant beam optical scanning system for directing a light scanning beam through a selected scan angle relative to an optical deflecting axis of the system, including a light beam generating means, comprising the combination of:

rotatable deflecting means having a rotational axis disposed substantially adjacent the optical deflecting axis of the system;
   at least one light beam from said light beam generating means directed towards the optical deflecting axis to impinge upon the rotatable deflecting means; said rotatable deflecting means including reflecting surface means to redirect the impinging light beam through said selected scan angle and along a scan plane which extends substantially normal to the optical deflecting axis, wherein the redirected beam is deflected at the optical deflecting axis;
   fixed curved optical reflective means disposed at a position along the optical deflecting axis to receive the beam from the rotatable deflecting means within the scan plane and through the scan angle thereof, and further disposed from the optical deflecting axis at an optical distance substantially that of its nominal radius of curvature;
   said fixed curved optical reflective means including fixed spot forming means for shaping and focusing the redirected light beam to define a scan beam which is directed back to essentially be deflected at the optical deflecting axis, which scan beam is forcused at least once to form a scan spot which moves along an arcuate line of length commensurate with said selected scan angle; and
   wherein the scan beam and the beam from the rotatable deflecting means are deflected through said selected scan angle about said optical deflecting axis.

2. The system of claim 1 wherein said fixed spot forming means includes spherical reflector means substantially concentrically disposed relative to the optical deflecting axis at a distance therefrom substantially that of its nominal radius of curvature and within said scan plane and scan angle wherein said spherical reflector means focuses the scan beam to define the scan spot at a distance therefrom substantially equal to one half the nominal radius of curvature of the spherical reflector means, wherein the scan beam pivots about the optical deflecting axis.

3. The system of claim 2 wherein said fixed spot forming means further includes a fixed spherical concentric lens disposed at a point coincident with said optical deflecting axis, and at a position therealong to accept the focused scan beam from said spherical reflector means at the optical distance substantially that of its nominal radius of curvature, wherein said fixed spherical concentric lens refocuses the scan beam to define the scan spot.

4. The system of claim 1 wherein said fixed spot forming means includes spherical reflector means substantially concentrically disposed relative to the optical deflecting axis at a distance therefrom substantially that of its nominal radius of curvature and within said scan plane and scan angle; spherical refractor means disposed substantially midway between said spherical reflector means and and said rotatable deflecting means and within said scan plane and scan angle; a light reflective strip integrally disposed on the spherical refractor means; wherein the redirected beam from said rotatable deflecting means is reflected from said spherical reflector means to the light reflective strip and back to the spherical reflector means, whereupon the beam is redirected therefrom along a second scan plane in parallel relation to the first scan plane and back towards the optical deflecting axis; and a fixed spherical concentric lens having its nodal center disposed at a point coincident with said optical deflecting axis and in the second scan plane, wherein said fixed spherical concentric lens focuses the beam to define the scan beam which pivots through said selected scan angle about the nodal center of the concentric lens.

5. The system of claim 4 further comprising a mirror means disposed between said spherical reflector means and said fixed spherical concentric lens, said mirror means being disposed within said second scan plane to redirect said beam at an angle to the beam from said spherical reflector, wherein said fixed spherical concentric lens is disposed to intercept the redirect beam from the mirror means to provide said spot focus while maintaining the scan beam pivoting about the nodal center of the fixed spherical concentric lens.

6. The system of claim 5 further comprising beam splitter means disposed before said rotatable deflecting means to receive the light beam from said light beam generating means and to form a plurality of entrant light beams thereof, mirror means disposed to receive and redirect at least one of said plurality of entrant light beams into said rotatable deflecting means along selected relative angles thereto, wherein said plurality of entrant light beams impinge upon said rotatable deflecting means and are sequentially deflected thereby in spaced order against said spherical reflector means.

References Cited

UNITED STATES PATENTS

| | | | |
|---|---|---|---|
| 1,979,296 | 11/1934 | Sweeney | 350—6 X |
| 2,070,460 | 2/1937 | Traub | 350—6 X |
| 2,206,169 | 7/1940 | Eisenhut et al. | 350—6 X |
| 2,817,270 | 12/1957 | Mandler | 350—29 X |
| 2,923,220 | 2/1960 | Bouwers | 350—198 X |
| 3,051,044 | 8/1962 | McNaney | 350—6 X |
| 3,119,892 | 1/1964 | Shenker | 350—199 |
| 3,122,052 | 2/1964 | Buck | 350—7 X |
| 3,211,046 | 10/1965 | Kennedy | 350—7 |
| 3,353,022 | 11/1967 | Schwartz | 350—6 X |

OTHER REFERENCES

Prickett, "The Orthocamera: Orthogonal Photographic Scanning Camera," Photogrammetrical Engineering, vol. 16, No. 5, 1950, pp. 823–830.

Heckscher et al. "Contact Printing With Coherent Light," Photographic Science and Engineering, vol. 8, #5, September-October 1964, pp. 260–265.

PAUL R. GILLIAM, Primary Examiner

U.S. Cl. X.R.

178—7.6; 350—285; 250—219, 235